(12) United States Patent
Witter

(10) Patent No.: US 7,550,021 B2
(45) Date of Patent: Jun. 23, 2009

(54) PORTABLE CYCLONIC DUST COLLECTION SYSTEM

(76) Inventor: Robert M. Witter, 150 Robineau Rd., Syracuse, NY (US) 13207

( * ) Notice: Subject to any disclaimer, the term of this patent is extended or adjusted under 35 U.S.C. 154(b) by 555 days.

(21) Appl. No.: 11/489,182

(22) Filed: Jul. 19, 2006

(65) Prior Publication Data

US 2008/0016830 A1 Jan. 24, 2008

(51) Int. Cl.
*B01D 50/00* (2006.01)
(52) U.S. Cl. .............................. 55/295; 55/304; 55/305; 55/337; 55/343; 55/345; 55/356; 55/385.1; 55/467; 55/484; 55/DIG. 3
(58) Field of Classification Search ................... 55/467, 55/471–473, 337, 345, 346, 385.1–385.2, 55/356–358, 342, 344, 428–431, 459.1, 304, 55/305, 295, 296, 300
See application file for complete search history.

(56) References Cited

U.S. PATENT DOCUMENTS

| | | | | |
|---|---|---|---|---|
| 3,618,302 A * | 11/1971 | Cornett | ......................... | 55/304 |
| 4,062,664 A | 12/1977 | Dupre et al. | ................... | 55/319 |
| 4,198,290 A * | 4/1980 | Summers | ..................... | 209/710 |
| 4,201,256 A * | 5/1980 | Truhan | ..................... | 144/252.2 |
| 6,434,784 B1 | 8/2002 | Wisser | ......................... | 15/314 |
| 6,833,016 B2 * | 12/2004 | Witter | ......................... | 55/337 |
| 7,074,261 B2 * | 7/2006 | Murphy | ........................ | 96/223 |

OTHER PUBLICATIONS

Standish, Michael; Portable Dust Collectors, *Fine Woodworking*, Mar./Apr. 2006, pp. 38, ff.

* cited by examiner

*Primary Examiner*—Duane Smith
*Assistant Examiner*—Dung Bui
(74) *Attorney, Agent, or Firm*—Bernhard P. Molldrem, Jr.

(57) ABSTRACT

A portable dust collection system for a wood shop or other dust producing environment is employed with a sander, power saw, router or other dust-producing tool such as a woodworking tool. A movable platform has a vertical intake pipe supporting a head portion formed with a shroud. A centrifugal impeller drives the intake air stream plus any entrained particles into one or more cyclonic separators, which deposit the dust in a respective drum supported on the platform beneath the cyclone. The air inlet from the tool enters the vertical pipe at a point partway up the pipe, so that large particles drop to the bottom end of the pipe, where a clean-out door is provided. The exhaust or discharge air from the cyclonic separator(s) passes out through a filter cartridge to the ambient. A deflector plate prevents the dust from eddying back into the separator.

24 Claims, 8 Drawing Sheets

PORTABLE CYCLONIC DUST COLLECTION SYSTEM

BACKGROUND OF THE INVENTION

This invention is directed to devices and equipment for collecting bulk solids, for example, process dust coming from a dust generating tool, such as a sanding machine, saw, router, planer or the like, where the dust is entrained in a flow of air from the source machine, and is separated out at the dust collection equipment, which precipitates the dust precipitates into a bag, drum, barrel, or other container. The invention is more specifically directed to a compact and efficient device to be used to separate and collect the dust from the airstream emerging from the tool, and to clean and filter the air stream which is then returned to the ambient. The invention is likewise concerned with a simple and straightforward portable dust separation assembly that can be associated with a tool that has a duct from which the air stream plus the entrained dust particles proceed.

For many types of machines for processing a workpiece, some mechanism has to be provided to dispense with the grindings, chips, and particulate matter that is generated by the machine during operation. For example, in the case of wood working machines, such as saws, planers, sanders, joiners, and the like, wood dust that is removed from a workpiece has to be collected and removed from the work area so as to avoid creating either a breathing hazard for the workman or a fire hazard. More specifically, in the case of portable equipment, sanders and buffers, it is conventional to draw off the dust that is generated by the machines and then send the air that is carrying the dust into a filter bag arrangement, or to draw off the dust through a flexible hose or conduit. In such case, the conduit or hose extends from a dust outlet duct of the machine to a collection station. In the case of smaller equipment, e.g., palm sanders or trim sanders, the stream of air is pumped through a flexible hose conduit, with the entrained process dust, to a piece of equipment that provides suction and some filtering, e.g., a shop vacuum. The same problem of environmental dust arises in metal working and ceramics also.

A number of portable dust collectors for woodshop use have been proposed, which are typically known as single-stage dust collectors because they are intended to pull the dust, shavings and chips from a woodworking machine through an impeller in a single pass. In the typical example of a portable dust collector, a hose connects the collector to a dust outlet of the machine, and an airstream travels though this, with entrained dust, chips, and other particles, to the blower or impeller. The impeller, which is typically driven by a 1.5 HP 110 volt AC induction motor, moves the airflow through a tubular conduit to a cylinder that is open on its top and bottom. A lower bag of a plastic film which may include reinforcement, is disposed below the cylinder to capture large chips and shavings. Above the cylinder is a filter bag, which is intended to catch the fine dust particles and let the air flow pass through. A cartridge filter can be substituted where it is desired to trap particles down to one micron diameter. The entire unit is typically mounted on a base, e.g., a cart or platform, with wheels, rollers or casters so that the unit can be moved around the shop from one machine to another.

Because of the design, only about half the dust that is produced is separated out and falls into the lower bag, and the rest goes up to the upper filter. The upper filter tends to blind or clog after a limited operation time, which reduces the efficiency of the unit.

Also, a typical woodworking machine, such as a planer, joiner or table saw, requires an air flow of about 400 to 800 cfm to pick up all the generated dust in the air stream, and this is also the maximum air flow that these existing portable dust collector units can produce in normal operation. Consequently, for a woodworking machine that generates more dust than these machines, the air flow would not be sufficient to capture all the dust produced. However, it is not a simple matter to produce a bigger or more powerful dust collection unit of that design.

To date, a cyclonic dust collection system, in which the air flow and entrained process dust are drawn through a cyclone separator, has not been used in a portable dust collection unit. In practice, no one has attempted to use a true cyclonic separator as a dust separation and collection device between the dust producing tool and the portion of the unit where the air is filtered and returned to the ambient.

Further, the current equipment designs do not have any means for removing or loosening the collected dust particles from the filter, except to remove the filter and blast it with compressed air.

OBJECTS AND SUMMARY OF THE INVENTION

Accordingly, it is an object of this invention to provide an efficient portable dust collection arrangement that avoids the drawbacks of the prior art.

It is a more specific object to provide a dust collection arrangement that can be used in line with the dust producing tool and which uses a true cyclonic chamber to separate out between 95% and 99% of the dust entrained in the air stream emerging from the tool.

It is another object to provide a portable dust collection that is simple and straightforward in construction, highly reliable, and adaptable to a wide range of tools.

It is a further object of this invention to provide a dust collection system which can be used with any of a number or typical woodshop tools and machines, and which can be made available in a variety of sizes (and in a variety of air flow volumes).

It is yet another object to provide a dust collection system that deposits the dust particles into a conventional drum or equivalent, so that the dust can be removed and disposed of easily.

A further object is to provide a dust collection system of improved airflow design, so that its efficiency is increased and the level of process noise is decreased in respect to state-of-art portable dust collector units.

According to an aspect of the invention, a portable woodshop dust collection unit is formed upon a platform or base supported on a set of wheels, rollers, or other provision that permits the unit to be moved around the shop where needed. A vertical pipe rises from the base, with an air inlet duct that enters the pipe at a position partway up the pipe. This leaves a dead area below the air inlet duct where larger particles, as well as stones, nails, or other items of that nature fall into a bottom end of the vertical pipe. A clean-out door is provided here, so these items can be taken out. A power head is mounted at an upper end of the vertical pipe, which favorably has upper and lower flat plates and a peripheral wall between the upper and lower plates, with the peripheral wall having a number or arcuate, i.e., cylindrical portions. There is a fan chamber centered on the axis of the vertical intake pipe, and a centrifugal blower impeller is located in this chamber. Alongside this chamber there is a generally cylindrical cyclonic intake chamber (i.e., cyclone barrel portion) to receive the air flow from the fan chamber. The cyclonic separator includes this cyclonic intake chamber or barrel portion and a conic member attached just below it and coaxial with it. A vertical vortex tube or pipe is centered on the axis of the conic member and extends upward across the cyclonic intake chamber. A dust collection drum is positioned on the base below the cyclonic separator, and a dust conduit connects a lower nose of the conic member to the dust collection drum, so that the dust is separated out from the air flow in the conic member, and falls via the conduit into the drum. A filter device, e.g., a HEPA cartridge filter, is positioned above the head portion to filter air discharge through vortex tube. Favorably, the cartridge filter can be centered on the vortex tube, although in some embodiments a single cartridge could serve the vortex tubes of plural centrifugal separators.

In a preferred arrangement, the blower impeller has a has rear-inclined radial vanes, for higher efficiency and lower noise level.

In a preferred arrangement there is a quick disconnect fitting on the intake tube and this is adapted for attaching a flexible hose leading from a dust-producing machine.

The term "drum" as used here in not intended to be limited to a traditional, generally cylindrical rigid barrel, but can include many equivalent containers for receiving and holding the precipitated wood process dust. In some embodiments, a plastic bag formed of an extruded plastic film, e.g., polyethylene or vinyl can be used, e.g., a poly bag or liner. This may be supported in a frame or cage, but such support structure would be optional.

Favorably, the cylindrical cyclonic intake chamber can be configured with an annular intake channel formed around the vortex tube or pipe, with an opening at one side leading from the fan chamber and a baffle at the other side directing the flow of air downward into the conic member. This baffle can include a neutral vane, designed to extend inward into the cyclone barrel portion, protecting the incoming air flow from being affected by the airflow that is traveling around the center vortex tube. That is, the neutral vane blocks the air that would otherwise have wrapped around the vortex tube, and directs this airflow downwards. The neutral vane keeps the air flow as laminar as possible, leading to more efficient and quieter operation. There can be a small gap between the neutral vane and the vortex tube, so that larger particles do not collect here, but will fall down into the drum or barrel. The size of the gap can be selected to optimize the efficiency gain of the air flow. Without the neutral vane it would require more pressure to move the air flow at the same velocity through the cyclone. Within the cyclone, the air flow forms bands where the air flow is concentrated. The neutral vane assists in moving these bands downwards into the conic portion and away from the incoming air stream.

According to other preferred embodiments of this invention, the unit can have two, three, four, or more cyclonic separators distributed at angular positions around the head portion. The fan chamber would be located centered on the axis of the pipe and have a plurality of generally cylindrical cyclonic intake chambers spaced apart at positions around the fan chamber, so that the blower air flow is divided, and each of the cyclonic devices receives a portion of the air flow from the fan chamber. In this case, there are two or more cyclonic separators, each including a conic member below a respective one of the cyclonic intake chambers, and each with a vertical vortex tube or pipe positioned on the axis of the conic member and extending up across the associated cyclonic intake chamber. There is a dust collection drum for each of the cyclonic separators, with each being supported on the base or platform, and each being disposed below a respective one of the cyclonic separators. One or more filter units are positioned above the head portion to filter air that is discharged out the vortex pipes of the cyclonic separators.

Favorably, a cylindrical air filter cartridge has an annular end surface with a round opening of a predetermined diameter leading into the filter. A fitting or a clamp removably secures the cylindrical filter. A rotatable shaft can extend into the cartridge filter, with a crank at the top and a flexible finger at the lower end that extends between pleats of the filter cartridge. This can be rotated by turning the crank, and will snap past each crease or pleat, so as to knock at least some of the accumulated particles off. This allows the filter to be cleaned of some of the accumulated dust without having to remove it from the unit, and without needing to use compressed air, and without the dust going back into the ambient.

The above and many other objects, features, and advantages of this invention will become apparent from the ensuing detailed description of the preferred embodiments, which is illustrated in the accompanying Drawing.

DETAILED DESCRIPTION OF A PREFERRED EMBODIMENT

Figure 1:
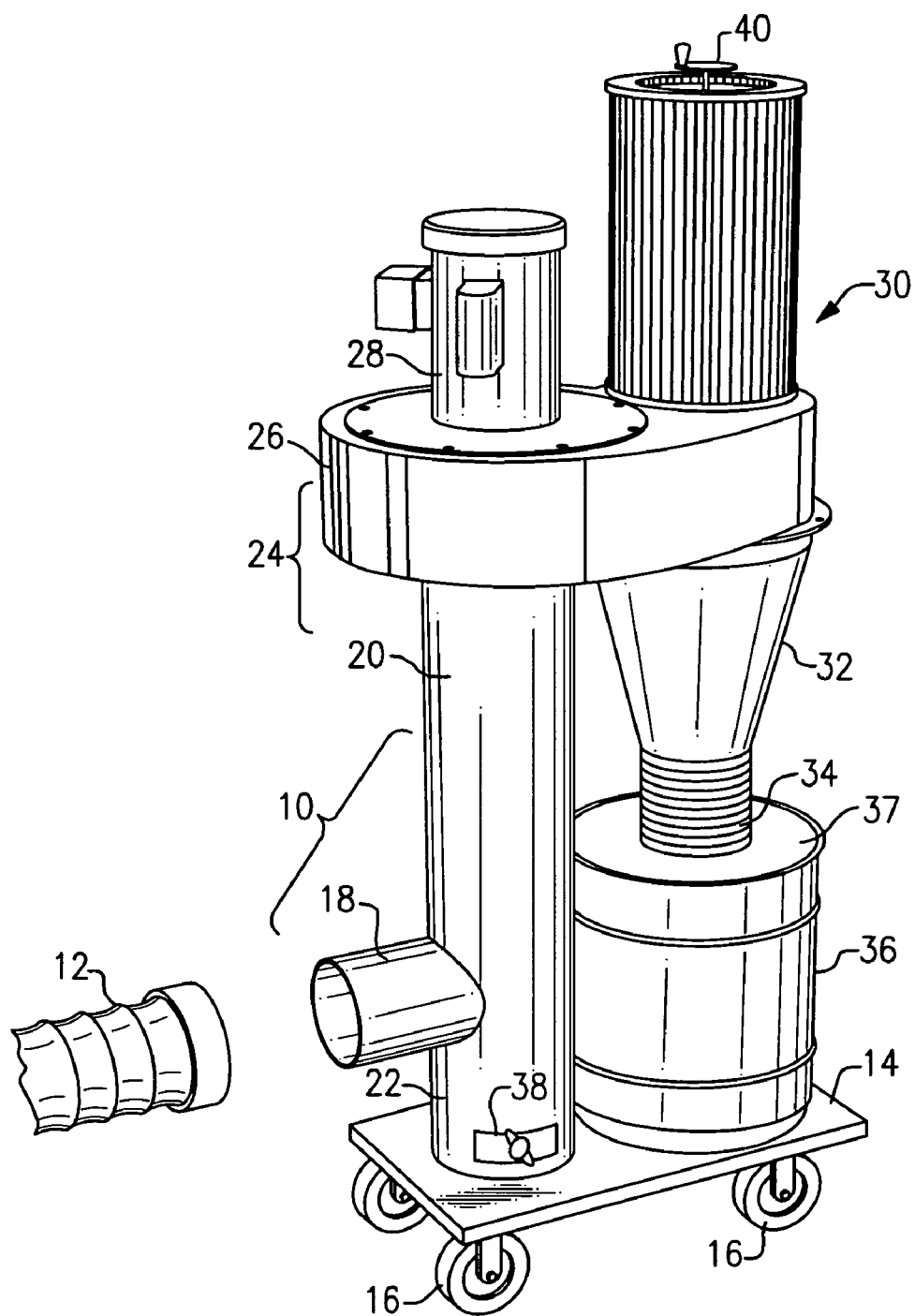
FIG. 1 is a perspective system view of a portable dust separator and collector system according to one embodiment of this invention.

Now with reference to the Drawing, FIG. 1 shows a woodshop application, in which a portable dust separation and collection device 10, according to an embodiment of the present invention, is coupled to a flexible duct or hose 12 to receive an airflow containing entrained wood process dust from a saw, sander, or other woodworking machine (not shown).

As illustrated here, the device 10 has a platform or base 14 with rollers, casters, or wheels 16, that permit the device to be rolled to a convenient location within the shop. An inlet pipe 18, which is coupled by a quick-disconnect coupling 21 to the intake hose 12, leads to a vertical intake pipe 20 that is mounted at its lower end onto the base 14. This forms a trap 22 for large particles or chunks, which settle at the base end of the pipe 20, out of the air stream. The inlet pipe 18 enters the vertical intake pipe 20 several inches above its lower end to define the trap 22.

At the upper end of the pipe 20 there is a head portion 24, in which there is a fan shroud 26, which contains a blower or impeller (not shown in FIG. 1). A shroud 26, which is formed of a series of generally arcuate shapes defines a fan chamber or blower chamber and also defines the barrel portion of a centrifugal separator. A vertical shaft AC induction motor 28 drives the impeller. A cylindrical pleated cartridge filter 30 is seated on a cyclone barrel portion 31 of the head portion 24. Beneath the barrel portion 31 is a conic shaped cyclone chamber 32. A lower end or nose of the conic shaped chamber 32 leads via a flexible duct 34 to a dust collection barrel 36. The latter rests on the cart or base 14. A lid 37 seals the top of the barrel 36, and the duct 34 fits onto to an opening on the lid 37. The lid is closed by means of a compression ring, so that air and entrained dust do not leak out at the lid of the barrel. A clean-out door 38 allows the user access to the lower end 22 of the pipe 20 to remove any debris that collects there.

Additionally, a hand crank 40 for a filter cleaner (described later) is shown protruding above the top end of the cartridge filter 30.

Figure 2:
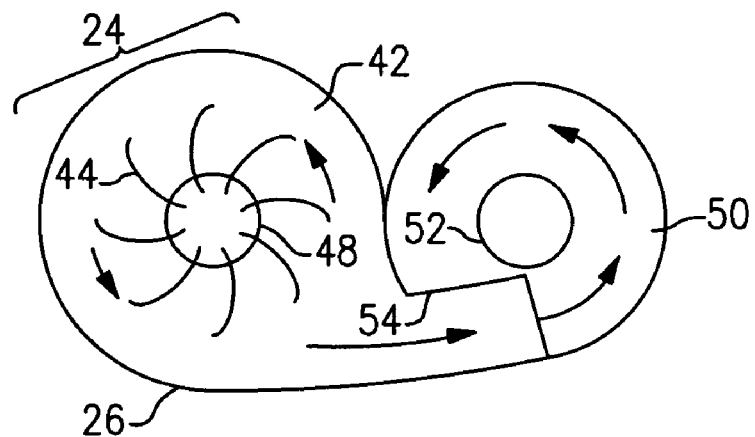
FIG. 2 is a sectional view of a portion of this embodiment demonstrating air flow.

The head portion 24, with its shroud 26 defining a fan chamber 42 and a cyclone barrel portion 50, is shown schematically in FIG. 2. Within the fan chamber 42 is a centrifugal impeller 44, here shown rotating in the counter-clockwise direction, and with radial vanes or blades that are rear-inclined radial vanes, i.e., oriented or curving away from the direction or rotation. This provides for higher efficiency and lower noise level than with either straight radial vanes or forward-inclined vanes. The impeller 44 is centered on a central opening 48 that is aligned with the vertical inlet pipe 20. The air flow direction, shown with an arrow, is out through an opening into the barrel portion 50 of the centrifugal separator, here defined between the curved shroud 26 and a vertical vortex pipe 52. A neutral vane 54 is provided at the opening, so that the air flow is blocked after circling one time around the vortex pipe, and is thus diverted downward into the conic cyclone chamber 32 that is just below. The neutral vane extends to the proximity of the vortex pipe 52, but there may be a small gap remaining at this position to optimize the air flow characteristics and to prevent larger chunks or material from being held up at this point. The neutral vane 54 prevents mixing of the incoming air stream with the air that is already in the centrifugal separator, and avoids turbulence from this, thus leading to greater efficiency and better separation of dust and air.

Figure 4:
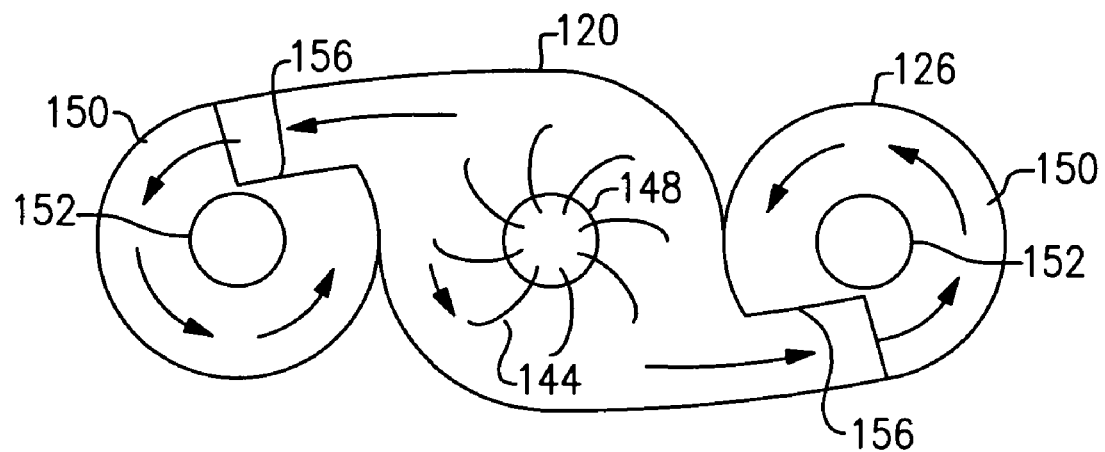
FIG. 4 is a sectional view of a portion of this embodiment.
Figure 3:
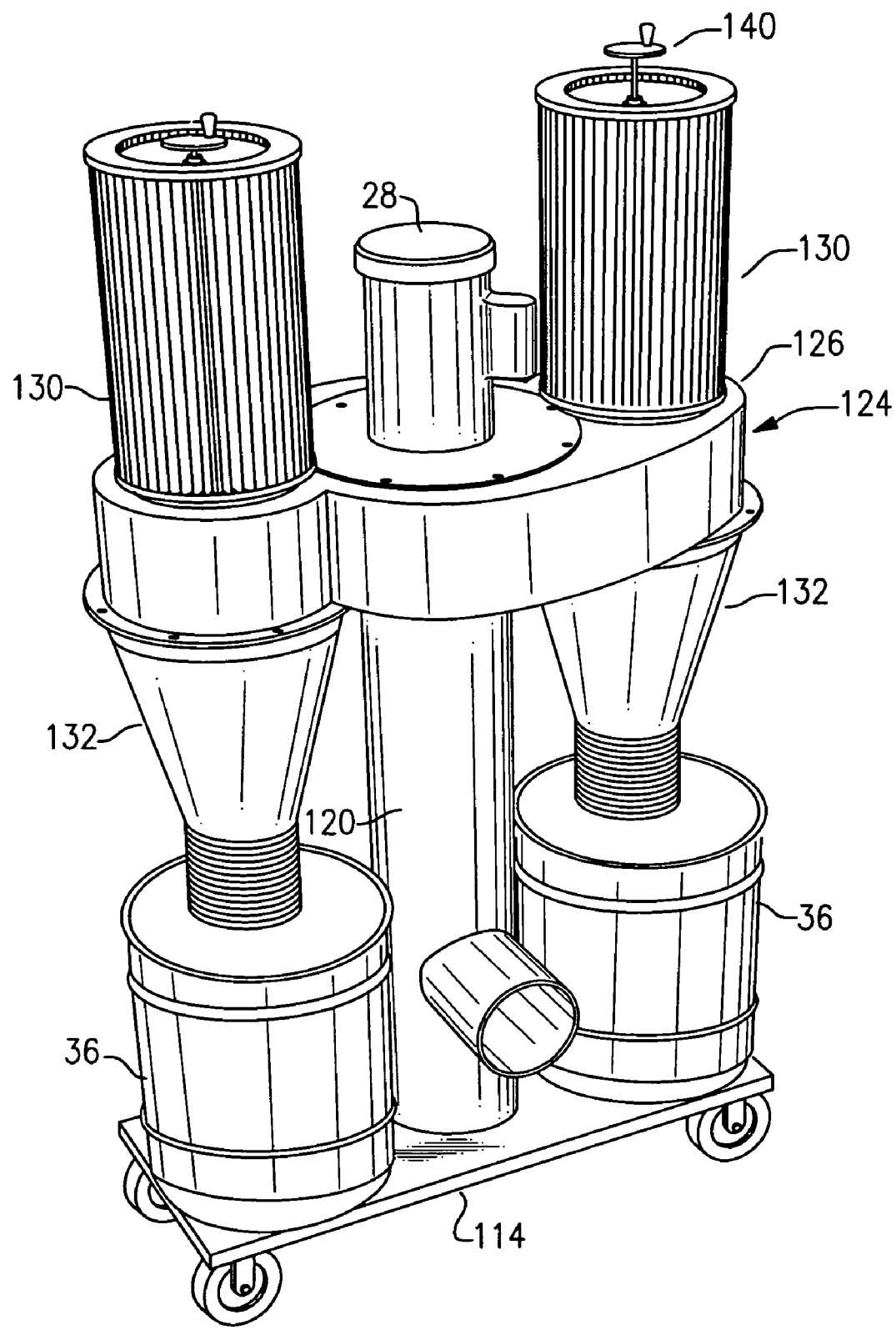
FIG. 3 is a perspective view of a portable dust separator and collector system of another embodiment.

FIGS. 3 and 4 illustrate a multi-cyclonic embodiment of the invention (i.e., a twin-cyclone system), that is, a portable dust containment system having two cyclonic separators and two dust collection barrels or drums. Here, elements that correspond to similar elements shown in the first embodiment are identified with the same reference numbers but raised by 100. A detailed description thereof need not be repeated.

In this embodiment, the platform or cart 114 supports the lower end of the vertical intake pipe 120, and also supports a pair of dust collection drums 36, 36. At the top of the pipe 120 is a head portion 124, defined between upper and lower plates and a curved peripheral wall 126. A motor 128 drives the centrifugal fan impeller 144 (FIG. 4), which takes in air from the pipe 120 through central opening 148 and impels the stream of air and entrained dust into a pair of cyclonic barrel portion 150, 150, these two elements being disposed one-hundred-eighty degrees apart. Each has an annular pathway defined between the shroud 126 and the central vortex tube 152. Each has a neutral vane 156 to direct flow of air into the cyclone and limit mixing of injected air with the air already in the cyclone.

With the dual cyclone and dual dust barrel configuration of this embodiment, the fan impeller 144 and motor 128 can be selected to provide double the air flow volume of the first embodiment, and thus can be used with larger woodworking machines, or can be connected with two different woodworking tools.

Similar to the first embodiment, there are filter cartridges 130, 130 situated at the exhaust end of the respective vortex tubes to filter out the remaining microscopic dust from the air stream and return clean filtered air to the ambient. Favorably, these cartridges are pleated HEPA cartridge filters, and are mounted onto the upper plate of the head 124 over each of the cyclonic separators. These can be clamped, secured, or attached to the head 124 in any of a number of ways. Each filter cartridge is provided with a cranked filter cleaner or dust remover, with the hand cranks 140 thereof being shown here.

In this embodiment, the air flow is split between the two cyclonic separators (e.g., chambers 132, 132), and the two barrels 36, 36 both fill with the process dust that is separated out from the dust-air stream.

Figure 5:
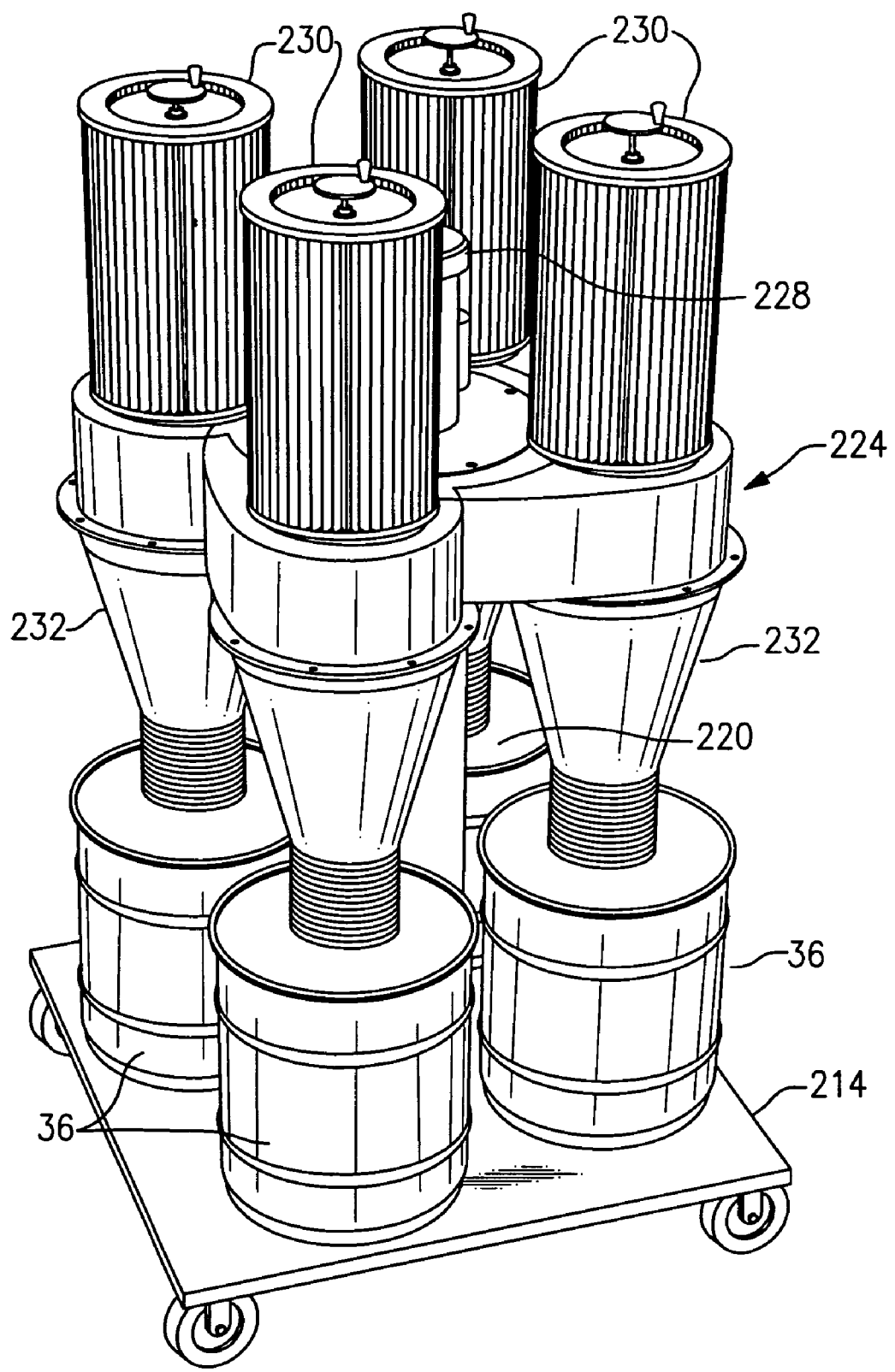
FIG. 5 is a perspective view of yet another embodiment.
Figure 6:
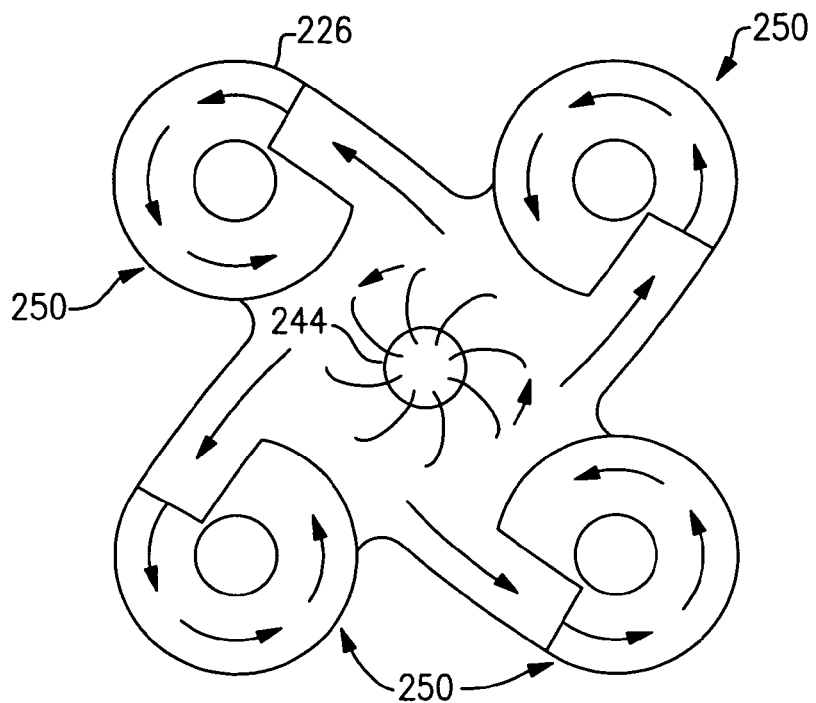
FIGS. 6 and 7 are sectional views of four- and three-cyclone embodiments, respectively.

Another multiple-cyclone portable dust collection unit, namely, a quad cyclone unit, is shown in FIG. 5. The elements that have corresponding elements in the first embodiment are identified again with similar reference numbers, but here raised by 200. Similar to the other embodiments, there is a wheeled platform or cart 214, a vertical intake pipe 220, a multiple-cyclone head 224, four cyclone conic portions 232, and four filter cartridges 230. A motor 228 drives an impeller 244 (FIG. 6) which sends the air flow into four cyclonic barrel portions 250 situated at ninety degree spacings. The four conic chambers 232 each have a drum 36 situated beneath its lower nose for the dust to fall into. These drums should have a cover that is sealed so that there is no air flow through the drum. The motor 228 and impeller 244 are selected to provide about four times the air flow volume of the first embodiment.

Figure 7:
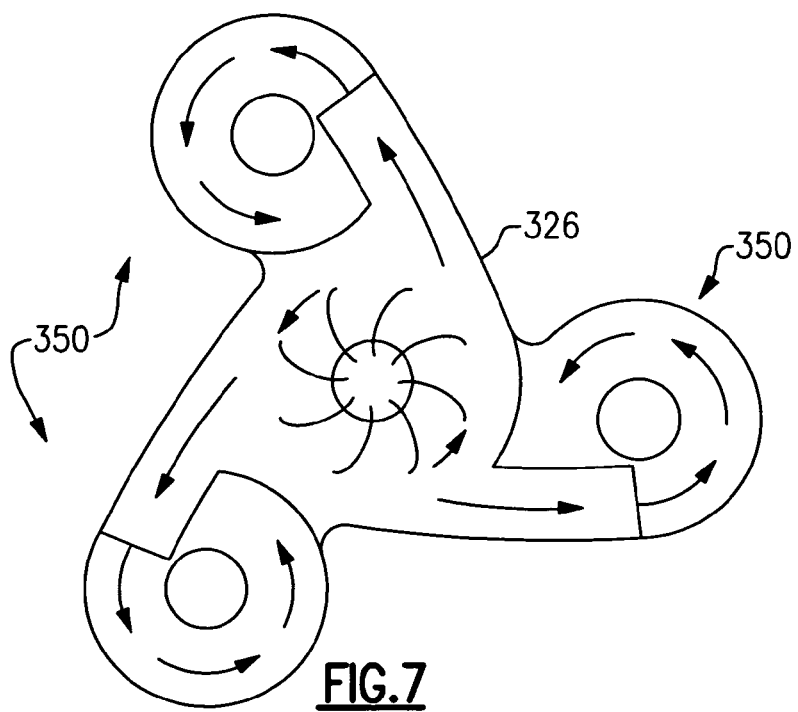

A three-cyclone configuration is also possible, as illustrated schematically in FIG. 7, with a shroud 326 of the head formed with three cyclone barrel portions 350 situated at one-hundred-twenty degree intervals around the central blower chamber. The number of cyclones is not limited to what is illustrated in these embodiments.

A polyethylene bag liner may optionally be used in the drum or barrel to facilitate disposal of the collected dust. If so, a vacuum hold down feature may be employed. So long as there is a positive pressure in the cyclone system, a flexible bag can be used to collect the dust that precipitates from the cyclones, rather than a rigid drum. In that case, a frame or cage can be used to help support the bag, which may be of polyethylene or another plastic film. Because of the positive pressure, there is an overpressure inside the drum 36, and a clamp or other equivalent step should be used to hold the drum closed and to keep dust from blowing out of the drum from under its cover or lid.

Figure 8:
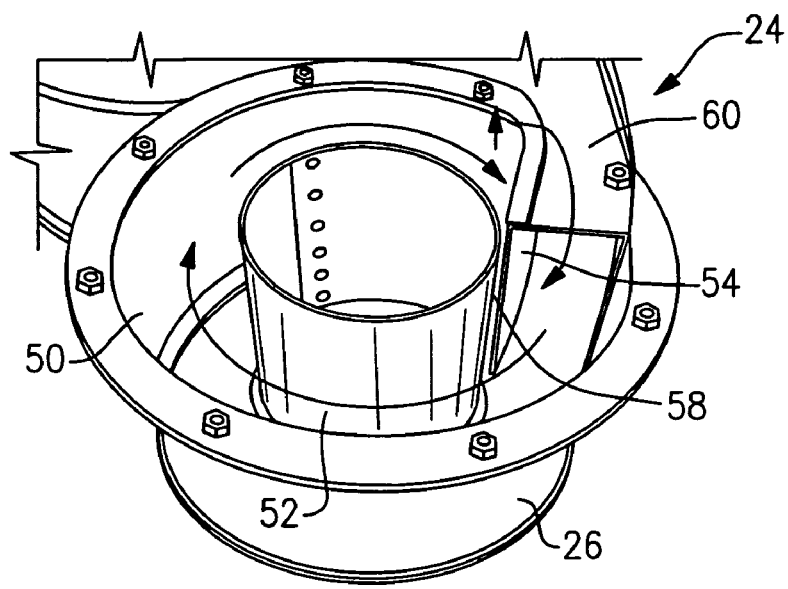
FIGS. 8 and 9 illustrate the structure and placement of the neutral vane employed in embodiments of the invention.
Figure 9:
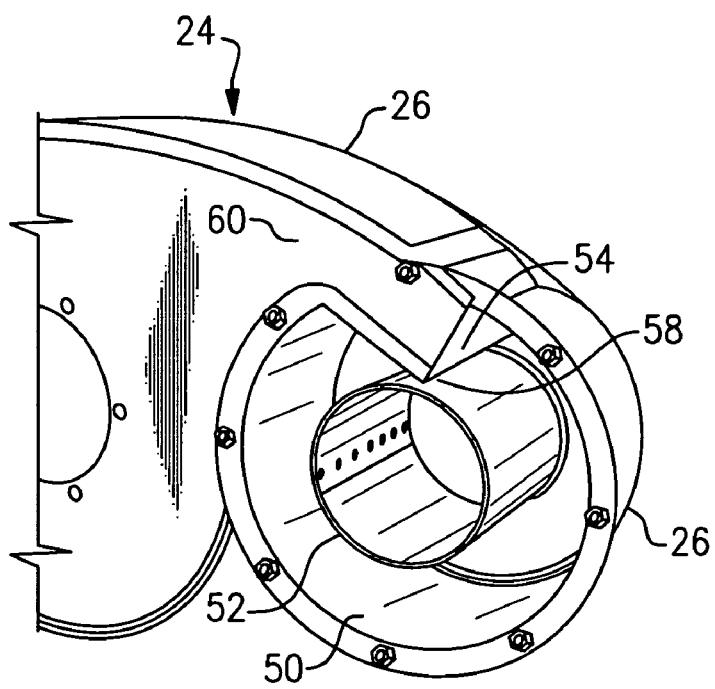

FIGS. 8 and 9 show details of the cyclone barrel portion 50 of the head portion, and the air inlet with the neutral vane 54. The neutral vane 54 extends in a generally vertical plane towards the vortex tube 52, leaving a small gap or space 58. The size of this gap 58 depends on the system capacity and air flow rate, and so can be made larger or smaller than shown, or may be omitted in some applications. Here a bottom plate 60 of the head is shown, extending out into the annular space of the barrel portion 50 to connect with the neutral vane 54. These create an inlet that extends inward into the annular space, protecting the incoming air from being affected by airflow coming around the center vortex tube. Air that would otherwise wrap around the vortex tube 52 is blocked and diverted downward into the cone. This helps keep the flow laminar, making for a quieter, more efficient operation. Flange and threaded posts are also shown here, to which the conic cyclone chamber 32 is to be attached.

Figure 10:
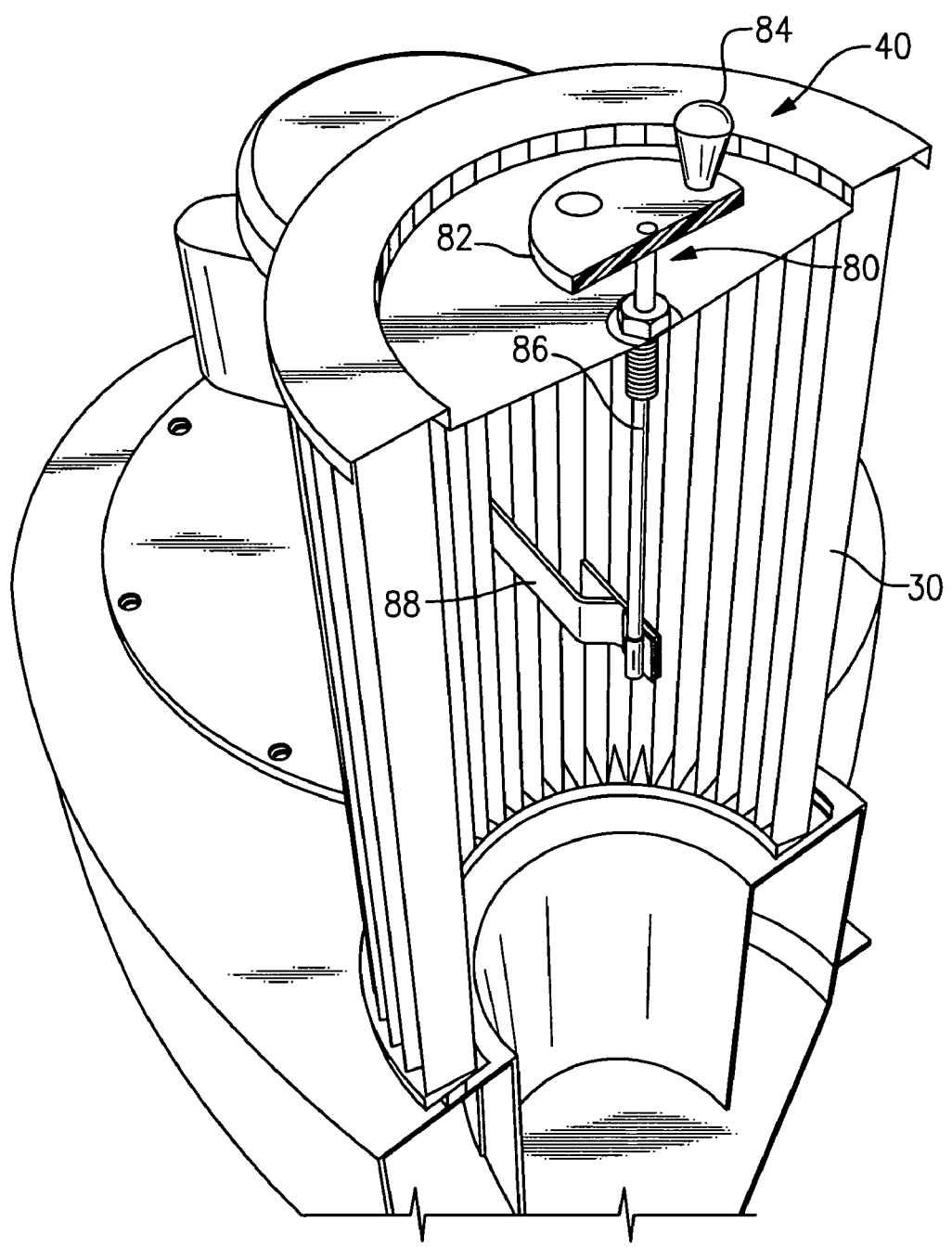
FIG. 10 is a cutaway view of a portion of the unit, showing a filter cleaning feature.

A crank-operated dust shaker arrangement 80 (See FIG. 10) can be employed to loosen the dust that collects on the inner part of the filter cartridge 30. At the top of the filter cartridge 30 is the crank 40, formed of a disk 82 and a handle 84, with a rod 86 descending into the interior of the filter cartridge. A rotary finger member 88, formed of a flexible material, e.g., Teflon, extends outward from the rod 86, and its tip or tips extend just into the pleats on the inside of the filter cartridge. After a few hours of operation, some dust can collect on the inner surfaces of the filter cartridge. This can be knocked off from the inside by rotating the crank 40, after turning off the air flow.

A drop-in silencer sleeve (not shown) can be used with a cyclonic separator dust collection and containment system, e.g., in a wood shop environment. The silencer may comprise a sleeve of acoustic foam that can be fitted inside the filter cartridge 30 to absorb some of the process noise or blower noise.

Figure 11:
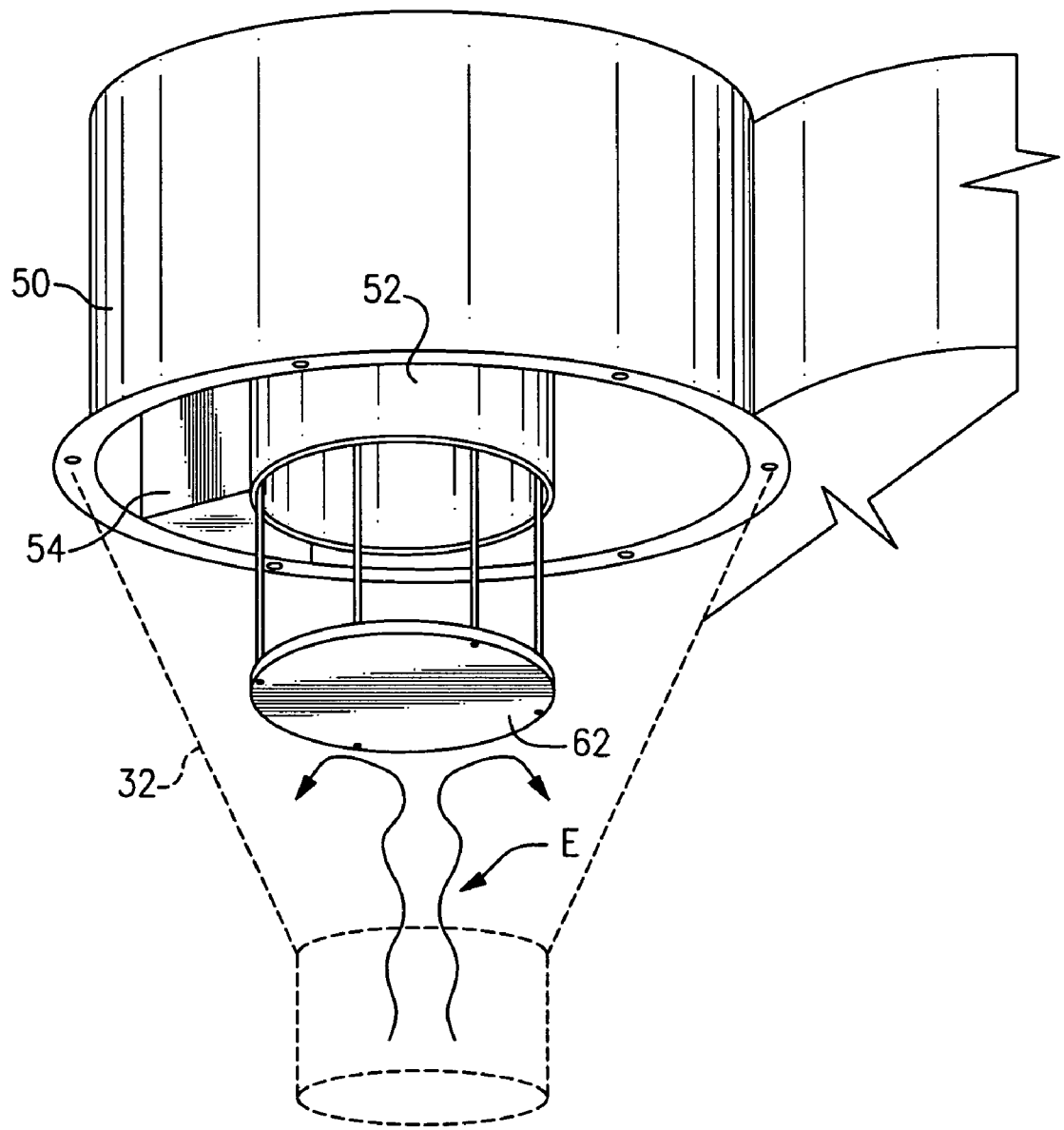
FIG. 11 is a perspective view showing a deflector plate suspended below the vortex tube in an embodiment of the invention.

FIG. 11 shows an embodiment in which a deflector plate 62 is suspended a few inches beneath the lower end of the vortex tube 52. Here the cyclonic chamber is shown removed from the cyclone barrel portion 50, but the position of the cyclonic chamber 32 is shown in ghost line. Here, upward eddy currents E are illustrated, being blocked by the deflector plate 62.

The function of the deflector plate 62 is to help reduce "eddying" from the drum up into the cyclone. With a shorter cyclone, of the type used here, eddying can result in a significant quantity of dust being picked up from the drum and carried back into the cyclone, or up the vortex tube 52 into the filter. The traditional approach to eddying would be to use a taller cyclone, which means making the entire portable unit taller or else using a very short drum. Here, the deflection plate 62 permits a shorter cone to be used. While the deflector plate shown here is a flat disk, in practice these can be spherical, conic, or another shape. The deflector plate does not adversely affect the cyclonic separation function.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

I claim:

1. Portable dust collection unit comprising

A base supported on a plurality of wheels;

A vertical pipe rising from the base, including an intake duct that enters said pipe;

A head portion mounted at an upper end of the vertical pipe; including a fan chamber centered on an axis of said pipe, and having a centrifugal impeller therein; and a generally cylindrical cyclonic intake chamber at one side of said fan chamber to receive an air flow from said fan chamber;

A cyclonic separator including a conic member below said cyclonic intake chamber and coaxial therewith; and a vertical vortex pipe positioned on the axis of the conic member and extending up across said cyclonic intake chamber;

A dust collection drum positioned on said base below said cyclonic separator;

A dust conduit connecting a nose of said conic member with said drum; and

A filter member positioned above the head portion to filter air discharged through said vortex pipe.

2. A portable dust collection unit according to claim 1 wherein said intake duct enters said vertical pipe at a position partway up the pipe so that large particles fall into a bottom end of the pipe.

3. A portable dust collection unit according to claim 2 comprising a clean out door at the bottom end of said vertical pipe.

4. A portable dust collection unit according to claim 1 wherein said impeller has a plurality of rear-inclined vanes.

5. A portable dust collection unit to claim 1 wherein said intake duct includes a quick disconnect fitting adapted for attaching a flexible hose leading from a dust-producing machine.

6. A portable dust collection unit according to claim 1 wherein said dust collection drum includes a generally cylindrical rigid barrel.

7. A portable dust collection unit according to claim 1 wherein said dust collection drum includes a film bag.

8. A portable dust collection unit according to claim 1 wherein said cylindrical cyclonic intake chamber includes an intake channel formed around said vortex pipe, and including an opening at one side leading from said fan chamber and a baffle at the other side directing the flow of air downward into the conic member.

9. A portable dust collection unit according to claim 8 wherein said baffle includes a neutral vane.

10. A portable dust collection unit according to claim 1 wherein said head portion includes a flat lower plate, a flat upper plate, and a peripheral wall formed of a plurality of cylindrical wall portions.

11. A portable dust collection unit according to claim 1 further comprising a deflector plate disposed within said conic member beneath said vortex pipe.

12. Portable dust collection unit comprising

A base supported on a plurality of wheels;

A vertical pipe rising from the base, including an intake duct that enters said pipe;

A head portion mounted at an upper end of the vertical pipe; including a fan chamber centered on an axis of said pipe, and having a centrifugal impeller therein; and a plurality of generally cylindrical cyclonic intake chambers spaced apart at positions to the side of said fan chamber to receive an air flow from said fan chamber;

A plurality of cyclonic separators, each including a conic member below said respective cyclonic intake chamber and coaxial therewith; and a vertical vortex pipe positioned on the axis of the conic member and extending up across the associated cyclonic intake chamber;

A plurality of dust collection drums positioned on said base, each disposed below a respective one of said cyclonic separators;

Dust conduits each connecting a nose of one of said conic members with the associated dust collection drum; and One or more filter members, each positioned above the head portion to filter air discharged through said vortex pipes of said cyclonic separators.

13. A portable dust collection unit according to claim 12, wherein said intake duct enters said vertical pipe at a position partway up the pipe so that large particles fall into a bottom end of the pipe.

14. A portable dust collection unit according to claim 13 comprising a clean out door at the bottom end of said vertical pipe.

15. A portable dust collection unit according to claim 12 wherein said blower has a plurality of rear-inclined vanes.

16. A portable dust collection unit according to claim 12 wherein said intake duct includes a quick disconnect fitting adapted for attaching a flexible hose leading from a dust-producing machine.

17. A portable dust collection unit according to claim 12 wherein dust collection drum includes a generally cylindrical rigid barrel.

18. A portable dust collection unit according to claim 12 wherein said dust collection drum includes a film bag.

19. A portable dust collection unit according to claim 12 wherein each said cylindrical cyclonic intake chamber includes an intake channel formed around said vortex pipe, and including an opening at one side leading from said fan chamber and a baffle at the other side directing the flow of air downward into the associated conic member.

20. A portable dust collection unit according to claim 19, wherein said baffle includes a neutral vane.

21. A portable dust collection unit according to claim 12 wherein said head portion includes a flat lower plate, a flat upper plate, and a peripheral wall formed of a plurality of cylindrical wall portions.

22. Portable dust collection unit comprising

A base supported on a plurality of wheels;

A vertical support member rising from the base;

A head portion supported at an upper end of the vertical support member; including a cyclonic separator disposed at one side of said head portion, said cyclonic separator including a conic chamber; and a vertical vortex pipe positioned on the axis of the conic chamber and extending up therefrom;

An intake pipe through which a flow of dust-laden air is supplied to an inlet of said cyclonic separator;

A dust collection drum positioned on said base below said cyclonic separator;

A dust closure connecting said conic member with said dust collection drum and closing off an upper month of said drum;

A final filter member carried on said head portion to filter air discharged through said vortex pipe; and A fan positioned in said head portion for causing said flow of air to pass into said intake pipe, through said cyclonic separator, said vortex pipe, and said final filter, such that dust separated from said flow of air drops into said dust collection drum, and the remaining air flow is returned to the ambient as filtered air.

23. A portable dust collection unit according to claim 22, wherein said final filter includes a cylindrical pleated cartridge filter.

24. A portable dust collection unit according to claim 23, further comprising a rotary dust shaker arrangement for cleaning dust from said cartridge filter, and including a rod descending into an interior of said cartridge filter, and at least one finger that extends outward from said rod to contact pleats on an inside of said cartridge filter.

* * * * *